Oct. 24, 1944.  H. C. RESSLER  2,361,360
SINGLE POSITION CLUTCH
Filed March 11, 1942
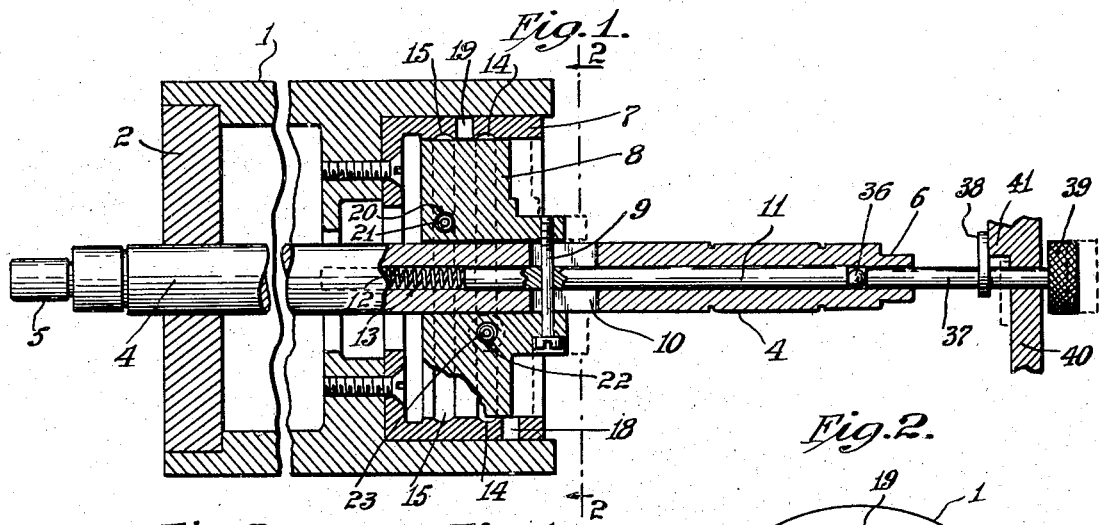
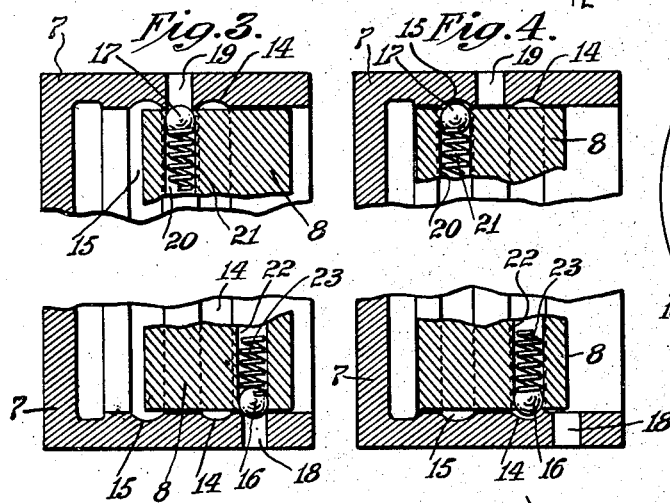 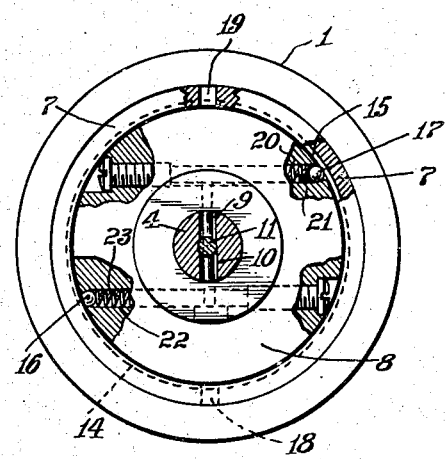
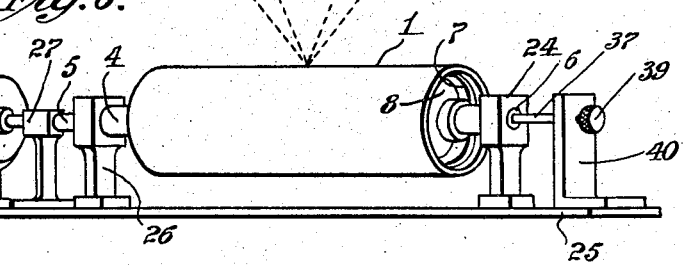
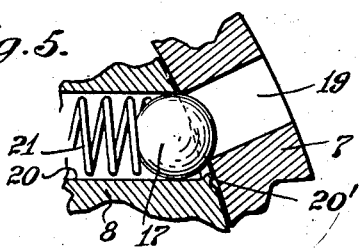
INVENTOR
Hugh C. Ressler
BY
Alfred W. Barber
ATTORNEY Patented Oct. 24, 1944

2,361,360

UNITED STATES PATENT OFFICE 2,361,360

SINGLE POSITION CLUTCH

Hugh C. Ressler, West Brighton, N. Y.

Application March 11, 1942, Serial No. 434,192

3 Claims. (Cl. 192—74)

The present invention concerns clutches and, in particular, a single position clutch suitable for facsimile scanner drums and the like.

One object of the present invention is to provide an improved clutch mechanism capable of especially smooth operation.

Another object is to provide an improved clutch mechanism which operates smoothly and yet engages automatically.

Still another object is to provide an improved clutch mechanism which engages only in a fixed position and still without jolting at any point from rest to full speed.

A further object is to provide an improved clutch mechanism having the above characteristics, together with a simplified operating or disengaging mechanism.

A still further object is to provide a single position clutch which is mechanically balanced.

These and other objects will be evident from the detailed description of the invention given in connection with the various figures of the drawing.

In the past there have been two general types of clutches. One type of clutch is one which provides a gradually increasing friction in starting a mechanism and which finally engages fully, but in a random position. The other type of clutch is one in which a key drops into a slot giving sudden engagement, but in a fixed position. In facsimile it is desirable to provide a clutch which provides fixed relation between the driving and the driven parts upon full engagement but one which engages smoothly. The clutch which is the subject of the present invention provides this gradual action and final fixed relationship. The fixed relationship is required in facsimile, so that in a synchronously operating system the scanner drum may be stopped and started without losing the phase condition of the system. The clutch should operate gradually so that the equipment is not thrown out of phase or unduly jarred by the stopping and starting of the drum.

In the drawing:

Fig. 1 shows a cross-section of one form of the present invention.

Fig. 2 shows a detail of the construction of Fig. 1.

Figs. 3 and 4 show additional details of the construction of Fig. 1.

Fig. 5 shows a greatly enlarged detail of a part of Fig. 1.

Fig. 6 shows the relation of the present invention to a complete facsimile scanner.

In Fig. 1 is shown a cross-section of one form of clutch, in accordance with the present invention. A facsimile drum 1, is supported by end piece 2 and clutch parts 8 and 7 upon shaft 4, and is free to turn thereon. Shaft 4 is turned down at its ends to form bearings 5 and 6. Inside drum 1 is fitted the outer part of the clutch 7. This outer part of the clutch 7 contains a round opening carrying grooves 14 and 15 and the round holes 18 and 19. Fitting into part 7 is the inner part of the clutch 8 which is keyed to shaft 4 by means of key 9 passing thru keyway 10 and operating pin 11. Keyway 10 is elongated along the length of shaft 4, so that the inner part of the clutch 8 may slide back and forth along shaft 4. Projecting slightly from the surface of part 8 are ball bearing balls 16 and 17 (Fig. 2) spaced in the direction of axis 4 by the same amount as grooves 14 and 15 and holes 18 and 19. Pressing against key 9 is spring 12 held in well 13 in shaft 4. Opposite spring 12, shaft 4 is hollow and fitted with the clutch operating pin 11.

As is shown in the detail drawing of Figs. 3 and 4 balls 16 and 17 are pressed in a substantially radial direction by springs 21 and 23 fitting in holes 20 and 22. Balls 16 and 17 are prevented from falling out of holes 20 and 22 by narrowing the outer ends of holes 20 and 22 slightly as shown in detail at 20' in Fig. 5.

In operation, pin 11 is pushed inward to disengage the clutch and is allowed to move outward to engage the clutch. Shaft 4 is turned by suitable means and when the clutch is engaged, drum 1 is tied to shaft 4 and turns at the same speed. When the clutch is disengaged, drum 1 is freed from shaft 4 and may be held still for the purpose of attaching copy to it.

The clutch is disengaged by pushing pin 11 inward by means of rod 37 acting thru ball 36. Rod 37 is actuated by pushing in on knob 39 and turning it so that flange 38 passes over raised portion 41 on mounting 40. This moves the inner clutch part 8 by means of key 9 and against spring 12 until the relative positions of parts 7 and 8, shown in Fig. 4, is assumed. In this condition, ball 17 rides freely in groove 15, ball 16 rides freely in groove 14 and drum 1 is freed from the turning influence of shaft 4.

To engage the clutch, pin 11 is released and part 8 moves along shaft 4 until parts 7 and 8 are in the relative positions shown in Fig. 3. Ball 17 is then opposite hole 19 and ball 16 is opposite hole 18. As shaft 4 and hence part 8 rotates while drum 1 and part 7 stand still, balls 16 and 17 drop momentarily into holes 18 and 19 at each revolution, imparting a turning impulse to drum 1. This slight turning impulse gradually starts drum 1 to turning and at an increasing speed. Finally, drum 1 is speeded up to the same speed as shaft 4 and balls 16 and 17 drop into holes 18 and 19 and stay there, locking drum 1 to shaft 4. The dimensions of the various parts and the tension of springs 21 and 23 are chosen so that drum 1 is brought up to speed by a series of slight impulses and finally locked to shaft 4. This provides a smoothly starting drum free from large sudden shocks which might be reflected in the driving motor and result in loss of synchronization or at least the initial phasing of the motor. While this clutch starts the drum smoothly, it finally assumes a single position, whereby drum 1 and shaft 4 are in a predetermined relative position. Thus drum 1 may be stopped and restarted and drum 1 will always be in the same phase position with respect to the driving motor. In synchronized systems it is important to be able to stop and start drum 1 without changing the phase relations in the system, for instance, in order to change the copy being transmitted.

In Fig. 2 is shown a cross-section taken along line 2—2 in Fig. 1. It shows in detail the manner in which holes 20 and 22 pass thru clutch part 8. It shows the relation of holes 18 and 19 to clutch part 7. It also shows the relative positions of balls 16 and 17, pins 9 and 11 and springs 21 and 23.

While not intended to limit the applications of the clutch, Fig. 6 shows it applied to a facsimile pick-up scanner. Drum 1 is shown with shaft 4 projecting. Bearings 5 and 6 carried by mountings 26 and 24 are shown. Rod 37, knob 39 and mounting 40 are shown. A driving motor 28 drives shaft 4 thru a suitable gear box 27. Motor 28, ear box 27, bearings 24 and 26 and mounting 40 are carried by bed plate 25. Copy to be scanned is carried on the surface of drum 1. The scanning is carried out by means of a lamp 29 focussed to a fine spot by lens 31 and the light reflected by the copy on drum 1 is focussed on photo-electric cell 30 by means of lens 32. Signals generated by photo-electric cell 30 are amplified by amplifier 33 and are passed to a utilization means over wires 34 and 35.

It is obvious that balls 16 and 17, together with springs 21 and 23, may be interchanged with holes 18 and 19 and grooves 14 and 15 placed on part 8 without affecting the operation of the clutch.

While one embodiment and one application of the clutch which is the subject of the present invention have been shown and described, many modifications and other applications will be apparent to those skilled in the art within the spirit and scope of the invention as set forth in the appended claims.

What is claimed is:

1. A single position clutch including in combination, a drive shaft, a driving member keyed to said shaft and carrying a steel ball urged in a substantially radial direction by means of a spring, a member to be driven concentric with said driving member and including a concentric groove for allowing free passage of said ball and an opening for detaining said ball, means for moving said driving member to a position where said ball rides freely in said groove thereby disengaging said clutch, and a spring for moving said driving member to a position where said ball strikes said opening for engaging said clutch with a predetermined relative position of said driving member and said member to be driven.

2. A single position clutch including in combination, two concentric members, one of said members being a driving member and the other a driven member, at least two detent devices substantially equally spaced circumferentially around one of said members and carried by the last said member at different axial positions, and means for urging said detent devices into openings in the other of said members corresponding in number and position to said detent devices for transmitting torque from said driving member to said driven member at unique angular positions of said members with respect to each other.

3. A single position clutch including in combination, two concentric members, one of said members being a driving member and the other a driven member, at least two smoothly rounded detent devices substantially equally spaced circumferentially around one of said members and carried by the last said member at different axial positions, means for urging said detent devices into openings in the other of said members corresponding in number and position to said detent devices for transmitting torque from said driving member to said driven member at unique angular positions of said members with respect to each other, and wherein the said other said member carries annular grooves for receiving said detent devices for freeing said clutch to provide an idling condition.

HUGH C. RESSLER.